United States Patent
Barker et al.

(10) Patent No.: US 7,243,068 B2
(45) Date of Patent: Jul. 10, 2007

(54) MICROPHONE SETUP AND TESTING IN VOICE RECOGNITION SOFTWARE

(75) Inventors: Simon Barker, Watertown, MA (US); Jared J. Wolf, Bedford, MA (US)

(73) Assignee: Soliloquy Learning, Inc., Needham, MA (US)

( * ) Notice: Subject to any disclaimer, the term of this patent is extended or adjusted under 35 U.S.C. 154(b) by 337 days.

(21) Appl. No.: 10/939,167

(22) Filed: Sep. 10, 2004

(65) Prior Publication Data

US 2006/0069557 A1    Mar. 30, 2006

(51) Int. Cl.
*G10L 15/20*   (2006.01)
*H04R 29/00*   (2006.01)

(52) U.S. Cl. .................... 704/233; 381/58; 700/94

(58) Field of Classification Search ............ 704/226, 704/227, 228, 231, 233; 381/57, 58; 700/94
See application file for complete search history.

(56) References Cited

U.S. PATENT DOCUMENTS

| | | | | |
|---|---|---|---|---|
| 4,570,746 A | * | 2/1986 | Das et al. .................... 381/359 |
| 4,718,096 A | * | 1/1988 | Meisel ........................ 704/253 |
| 5,349,140 A | * | 9/1994 | Valenzin ..................... 181/158 |
| 5,615,273 A | * | 3/1997 | Lucey et al. ................ 381/361 |
| 5,822,718 A | * | 10/1998 | Bakis et al. ................ 702/180 |
| 5,870,709 A | | 2/1999 | Bernstein |
| 5,875,428 A | | 2/1999 | Kurzweil et al. |
| 5,920,838 A | | 7/1999 | Mostow et al. |
| 5,949,886 A | * | 9/1999 | Nevins et al. ................. 381/57 |
| 5,999,903 A | | 12/1999 | Dionne et al. |
| 6,014,464 A | | 1/2000 | Kurzweil et al. |

(Continued)

OTHER PUBLICATIONS

Fairweather et al., "Overcoming Technical Barriers to a Speech-enabled Children's Reading Tutor," retrieved from http://www.research.ibm.com/AppliedLearningSciWeb/Fairweather/techbar.pdf, IBM T.J. Watson Research Center, Yorktown heights, NY, 12 pages.

(Continued)

*Primary Examiner*—Martin Lerner
(74) *Attorney, Agent, or Firm*—Fish & Richardson P.C.

(57) ABSTRACT

Systems, devices, and methods for performing a microphone test routine are disclosed during an initial setup of a speech recognition program and at a predetermined time intervals during use of the speech recognition program to detect recognition errors associated with the microphone.

42 Claims, 11 Drawing Sheets

U.S. PATENT DOCUMENTS

| | | |
|---|---|---|
| 6,017,219 A | 1/2000 | Adams, Jr. et al. |
| 6,033,224 A | 3/2000 | Kurzweil et al. |
| 6,052,663 A | 4/2000 | Kurzweil et al. |
| 6,068,487 A | 5/2000 | Dionne |
| 6,137,906 A | 10/2000 | Dionne |
| 6,157,913 A | 12/2000 | Bernstein |
| 6,188,779 B1 | 2/2001 | Baum |
| 6,199,042 B1 | 3/2001 | Kurzweil |
| 6,246,791 B1 | 6/2001 | Kurzweil et al. |
| 6,256,610 B1 | 7/2001 | Baum |
| 6,266,571 B1 * | 7/2001 | Fado et al. .................. 700/94 |
| 6,320,982 B1 | 11/2001 | Kurzweil et al. |
| 6,324,499 B1 * | 11/2001 | Lewis et al. ................ 704/233 |
| 6,435,876 B1 | 8/2002 | Chen |
| 6,634,887 B1 | 10/2003 | Heffernan, III et al. |
| 6,731,993 B1 * | 5/2004 | Carter et al. .................. 700/94 |
| 6,935,458 B2 * | 8/2005 | Owens ....................... 181/205 |
| 2004/0234938 A1 | 11/2004 | Woolf et al. |
| 2005/0071166 A1 * | 3/2005 | Comerford et al. ......... 704/272 |

OTHER PUBLICATIONS

Banerjee et al., "Evaluating the Effect of Predicting Oral Reading Miscues" Project LISTEN; retrieved from http://www-2.cs.cmu.edu/~listen/pdfs/Eurospeech2003_Evaluating_predicted_mis, 4 pages.

Mostow et al. "A Prototype Reading Coach that Listens"; retrieved from http://www-2.cs.cmu.edu/%7Elisten/pdfs/aaai94_online.pdf, 9 pages.

* cited by examiner

| Microphone Signal Characteristics | 40 |
|---|---|
| Volume / Gain | 42 |
| Hum | 44 |
| Breath Pops | 46 |
| Signal-to-Noise Ratio (SNR) | 48 |
| Loss of connection | 49 |

FIG. 3

MICROPHONE SETUP AND TESTING IN VOICE RECOGNITION SOFTWARE

BACKGROUND

This invention relates to voice recognition software, and more particularly to microphone setup for voice recognition tutoring software to assist in reading development.

A microphone receive varying pressure waves in the air and converts the pressure waves into varying electrical signals. In order to produce a good quality signal, the microphone should be set up correctly. In reading fluency software, setup of the microphone can influence signal quality, which can influence the comparison of received audio to stored patterns for pronunciation and fluency determinations. Microphone setups often include placement of the microphone relative to the user and adjustment of the gain based on the strength of the received signals.

SUMMARY

According to an aspect of the present invention, a method includes performing a microphone test routine during an initial setup of a speech recognition program. The routine includes analyzing signal quality of a received electrical signal from a microphone. The method also includes performing, at a predetermined regular time intervals, the microphone testing routine during use of the speech recognition program to detect recognition errors associated with the microphone and signaling a problem associated with the microphone after a predetermined number of errors associated with the microphone have been detected.

Embodiments may include one or more of the following.

The errors associated with the microphone can include errors associated with wind noise in the microphone caused by the user's breath stream from the user entering utterances into the microphone. The errors associated with the microphone can include errors associated with hum in the signal received from the microphone. The errors associated with the microphone can include errors associated with a low signal to noise ratio (SNR). The errors associated with the microphone can include errors associated with clipping of audio received by the microphone. The errors associated with the microphone can include errors associated with a loss of connection to the microphone.

The method can also include automatically adjusting a parameter for the microphone based on the signal quality. The method can include tracking the errors.

In another aspect, a method for testing a signal quality for a microphone includes testing a first signal to determine if hum exists in the first signal. The method also includes testing a second signal to determine if breath pops are present in the second signal and testing a third signal to determine if a signal to noise ratio for the third signal is within an acceptable range.

Embodiments may include one or more of the following. Testing a signal to determine if breath pops are present in the second signal can include analyzing a test phrase including words beginning with at least one of the letter 'p' and the letter 't'. Analyzing a test phrase can include analyzing a signal in a particular frequency range. The frequency range can be in a range near a frequency of nearby a.c. power sources that may interfere with the signal from the microphone. Analyzing a test phrase can include determining speech energy attributed to speech in the received signal corresponding to the test phrase and determining noise energy attributed to noise in the received signal. The method can also include comparing the speech energy to the noise energy. Testing a signal to determine if a hum exists can include detecting presence of an approximately constant signal component. The approximately constant signal can be within a predetermined frequency range. The method can also include testing a sound level of the signal. The first signal, second signal, and third signal can be the same signal or can be different signals. The method can include setting a gain for the microphone.

In another aspect, the invention includes a computer program product residing on a computer readable medium. The computer program produce includes instructions for causing an electrical device to perform a microphone test during an initial setup of a speech recognition program. The routine includes instructions to analyze signal quality of a received electrical signal from a microphone and set a gain for the microphone. The routine also includes instructions to perform at a predetermined regular time interval the microphone testing routine during use of the speech recognition program to detect recognition errors associated with the microphone and signal a problem associated with the microphone after a predetermined number of errors associated with the microphone has been detected.

Embodiments may include one or more of the following.

The routine can include instructions to detect errors associated with wind noise in the microphone caused by a user's breath stream. The routine can also include instructions to detect errors associated with hum in the signal received from the microphone. The routine can also include instructions to detect errors associated with a low signal to noise ratio (SNR).

In another aspect, the invention includes a computer program product residing on a computer readable medium. The computer program product includes instructions for causing an electrical device to test a first signal to determine if a hum exists in the first signal. The computer program product also includes instructions to test a second signal to determine if breath pops are present in the second signal and test a third signal to determine if a signal to noise ratio for the third signal is within an acceptable range.

Embodiments may include one or more of the following.

The instructions to test a signal to determine if breath pops are present in the second signal can include instructions to analyze a test phrase including words beginning with at least one of the letter 'p' and the letter 't'. The instructions to analyze can include instructions to analyze a signal in a particular frequency range. The instructions to analyze can include instructions to determine speech energy attributed to speech in the received signal corresponding to the test phrase, determine noise energy attributed to noise in the received signal, and compare the speech energy to the noise energy.

In a further aspect, the invention includes a device configured to perform a microphone test during an initial setup of a speech recognition program. The device can be configured to analyze signal quality of a received electrical signal from a microphone and set a gain for the microphone. The device can be configured to perform at a predetermined regular time interval the microphone testing routine during use of the speech recognition program to detect recognition errors associated with the microphone and signal a problem associated with the microphone after a predetermined number of errors associated with the microphone has been detected.

Embodiments may include one or more of the following.

The device can be configured to detect errors associated with wind noise in the microphone caused by a user's breath stream. The device can be configured to detect errors associated with hum in the signal received from the microphone. The device can be configured to detect errors associated with a low signal to noise ratio (SNR).

In a further aspect, the invention includes a device configured to test a first signal to determine if a hum exists in the first signal, test a second signal to determine if breath pops are present in the second signal, and test a third signal to determine if a signal to noise ratio for the third signal is within an acceptable range.

Embodiments may include one or more of the following.

The device is configured to test a signal to determine if breath pops are present in the second signal can include instructions to analyze a test phrase including words beginning with at least one of the letter 'p' and the letter 't'. The device is configured to analyze a signal in a particular frequency range. The device is configured to determine speech energy attributed to speech in the received signal corresponding to the test phrase, determine noise energy attributed to noise in the received signal, and compare the speech energy to the noise energy.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a block diagram depicting microphone signal characteristics.

DETAILED DESCRIPTION

Figure 1:
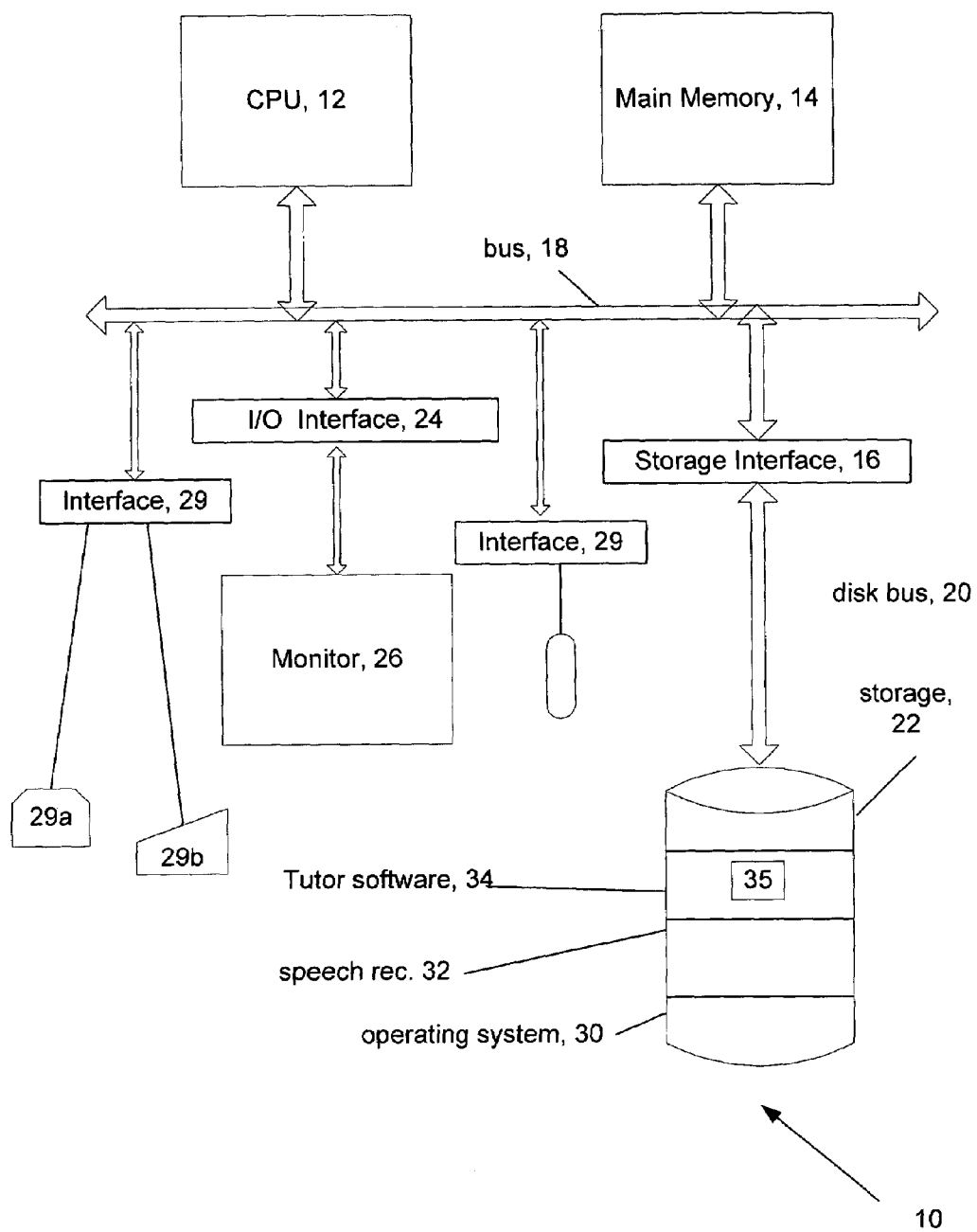
FIG. 1 is a block diagram of a computer system adapted for reading tutoring.

Referring now to FIG. 1, a computer system 10 includes a processor 12, main memory 14, and storage interface 16 all coupled via a system bus 18. The interface 16 interfaces system bus 18 with a disk or storage bus 20 and couples a disk or storage media 22 to the computer system 10. The computer system 10 would also include an optical disc drive or the like coupled to the bus via another interface (not shown). Similarly, an interface 24 couples a monitor or display device 26 to the system 10. Other arrangements of system 10, of course, could be used and generally, system 10 represents the configuration of any typical personal computer. Disk 22 has stored thereon software for execution by a processor 12 using memory 14. Additionally, an interface 29 couples user devices such as a mouse 29a and a microphone/headset 29b, and can include a keyboard (not shown) to the bus 18.

The software includes an operating system 30 which can be any operating system, speech recognition software 32 which can be any system such as the Microsoft Speech Recognition Engine, and tutoring software 34. The reading tutor software 34 is useful in developing reading fluency, as well as an assessment tool to assess a person's ability to read. A user would interact with the computer system principally though mouse 29a and microphone/headset 29b.

In addition, the tutor software 34, speech recognition software 32, and/or operating system 30 includes a microphone setup routine 35 that tests signals received from the microphone and adjusts parameters to provide optimum fidelity from the microphone. Alternatively, the microphone setup can exist as a separate program on the system. While microphone setup routine 35 is shown to be included in tutor software 34, the microphone setup routine 35 could be included in any portion of the storage unit 22. For example, the microphone setup routine 35 could be included in the speech recognition software, operating system 30, or as an independent unit in storage 22.

Figure 2:
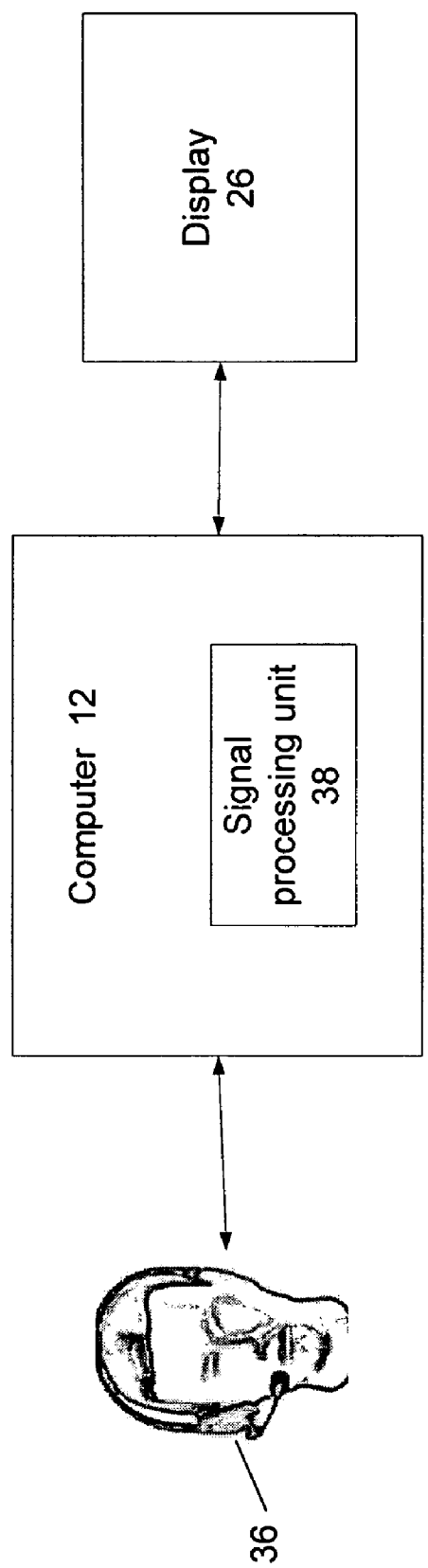
FIG. 2 is a block diagram of a data flow between a computer and a user.

Referring to FIG. 2, in order to assess reading fluency, a computer receives and analyzes speech signal input from a user. A microphone 36 in communication with computer 12 and signal-processing software 38 in computer 12 tests a signal received from microphone 36. Based on the microphone test results various microphone parameters such as signal gain are automatically adjusted by computer 12. Other signal characteristics for microphone 36 are based on the positioning of microphone 36 relative to the user's mouth. The ideal position for a microphone can vary depending on the type of microphone. To adjust such signal characteristics, the computer 12 can display instructions to a user on a display 26 or generate audio instructions for the user. Additional characteristics may require different user interaction or automatic adjustments by computer 12.

Referring to FIG. 3, a set of microphone signal characteristics 40 tested during the microphone setup and during use of the speech recognition program are shown. In general, microphone placement influences the quality of a speech signal received from the microphone. For example, the distance between the user's mouth and the microphone can influence signal clipping due to an overloud signal. In another example, the location of the microphone relative to the user's mouth can influence the signal. If the microphone is positioned in front of the user's mouth, the microphone can be subject to wind from the user's mouth which can influence the quality of the signal and hence the quality of assessing reading fluency and so forth.

It can be advantageous to test microphone characteristics both during the initial setup and on an ongoing basis during use of the speech recognition program. Tested characteristics include volume/gain level 42, hum detection 44, breath pop detection 46, signal-to-noise ratio detection 48, and/or loss of connection 49. The characteristics of a signal received from a microphone can be tested for signal characteristics 40 and adjustments to the signal or the microphone placement can be made to improve the quality of the audio signal.

The gain 42, also referred to as the amplification factor, is the extent to which an analog or digital amplifier boosts the strength of a signal. The gain for a system can be increased or decreased to increase or decrease the microphone volume depending on how softly or loudly the user is speaking. The user does not need to manually adjust the microphone volume because gain adjustment chooses the amplification level to optimize use of the signal for the speech recognition software 32. If the gain is too high, excess gain can cause the speech signal to be clipped because the signal will be in a non-linear range of the amplifier. Clipping of the speech signal can result in distortion that can cause recognition errors in the speech recognition program.

Another signal characteristic tested in the microphone setup and continuous microphone test is hum detection 44.

The hum detection ascertains whether a.c. main power is inducing noise into the signal from the microphone at a level high enough to cause problems for the speech recognizer.

The a.c. hum is detected by observing the energy level in the input signal at a frequency in a range about the frequency of nearby a.c. power sources that may interfere with the signal from the microphone. For instance, in the United States the frequency can be about 60 Hz; other frequencies may be used in other locations. Based on the frequency range for the a.c. signal, a cut-off frequency is established. For example, for an a.c. signal of 60 Hz, all signals below 62.5 Hz, $E_{62.5\ Hz}$ may be considered as hum. A hum level is determined for each recognized silence, by calculating the mean energy $E_{f=62.5\ Hz}$ at or near the selected frequency (e.g., 62.5 Hz) over the silence period, whereas in other parts of the world such as in Europe the frequency can be 50 Hz. The mean energy is auto-regressed to find an approximately stable estimate of the hum level as shown in equation (1):

$$\hat{E}_{hum}(t) = \lambda \hat{E}_{hum}(t-1) + \overline{E}_{f=62.5\ Hz}(t) \quad (1)$$

The hum-level is compared to a speech-level. The system can perform a fast Fourier Transform analysis on the received signal and detect the maximum fast Fourier transform (FFT) value for each audio frame of a recognized word. The system uses the maximum FFT value to calculate the mean peak energy for the word. The mean peak energy for the word is auto-regressed to estimate a peak signal energy. The speech portion of the energy spectrum is the portion above 157.25 Hz or another predetermined value. For example, the value can be selected to be above the second harmonic of the hum frequency). The calculation of the mean peak energy is shown in equation (2).

$$\hat{E}_{signal}(t) = \lambda \hat{E}_{signal}(t-1) + \overline{E}_{max\ ff>157.25\ Hz}(t) \quad (2)$$

If the recognizer decodes more than a predetermined number of frames, e.g., 100 frames of audio data into recognized words (e.g., encounters a second of real speech), the energy statistics are deemed reliable for this utterance and a hum ratio is calculated according to equation (3):

$$r = -\log_{10}\left|\frac{\hat{E}_{hum}(t)}{\hat{E}_{signal}(t)}\right| \quad (3)$$

An acceptable range is determined for the value of 'r'. For example, if 'r'<1.5, the 'r' value indicates that significant hum is present. Other ranges for 'r' could be used to signal hum detection.

Figure 4:
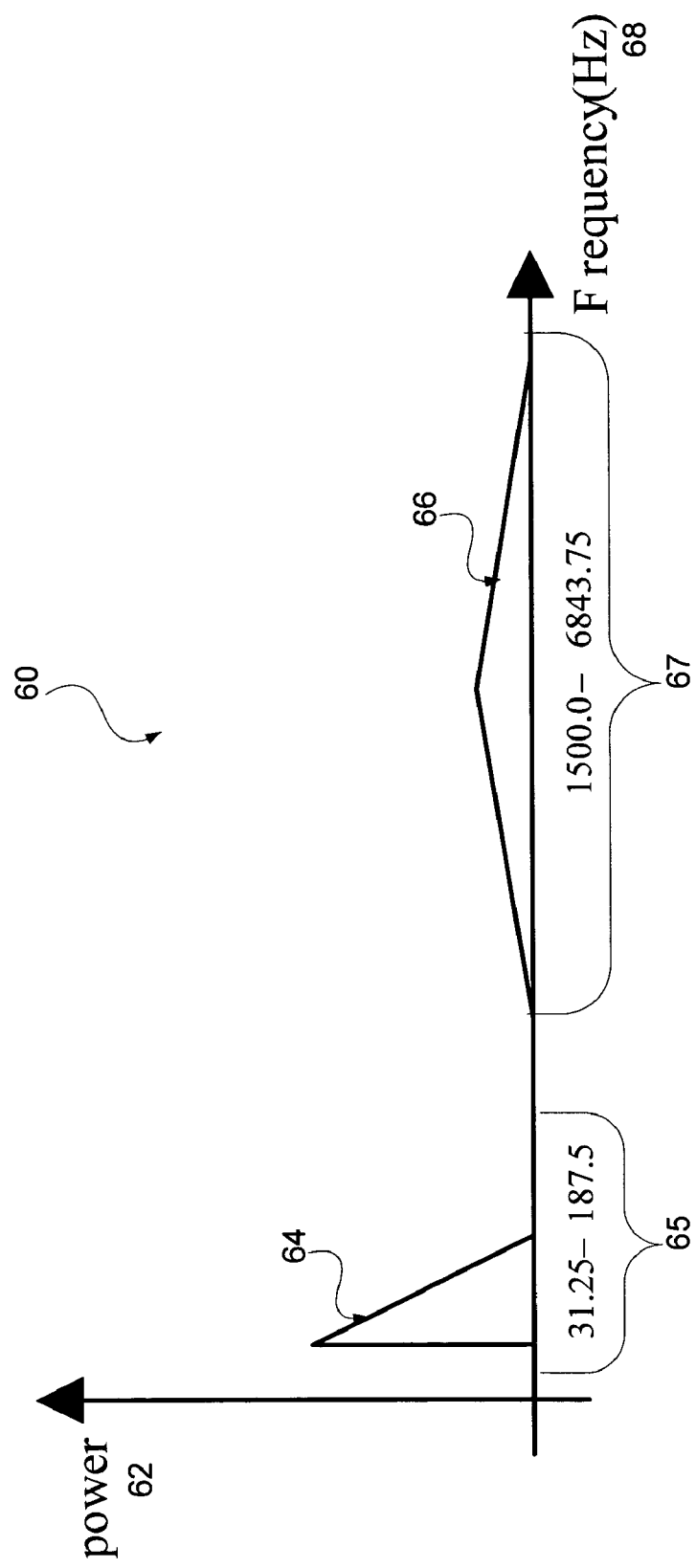
FIG. 4 is graph of power versus frequency for a detected breath pop and speech.

Referring to FIG. 4, a graph 60 of power 62 versus frequency 68 used for the detection of breath pops 46 is shown. Breath pops result from a low frequency signal associated with wind noise from the user's oral breath stream received by the microphone. Breath pops 46 may be especially prevalent for words beginning with letters such as 'p' or 't'. Therefore, the detection of breath pops can include detecting speech and audio quality for a series of words with a high occurrence of the letter 'p' or 't'.

To detect breath pops a weighted difference is computed between the energy in the lower portion of the frequency spectrum 65 (pertaining to wind noise from the user's mouth in the microphone) and the energy in the upper, 'speech', portion of the spectrum 67. The energies are computed using triangular filters 64 and 66 respectively. Filters 64 and 66 each have an area of 1. The energy in the lower filter 64 $E_b(t)$ is regressed to find a long-term level, giving $\hat{E}_b(t)$ (e.g., calculated over a second worth of data) as shown in equation (4):

$$\hat{E}_b(t) = \frac{1}{f+1}\left[f\hat{E}_b(t-1) + E_b(t)\right] \quad (4)$$

where f is the recognizer frame rate. The above regression is re-computed if the breath-pop detection algorithm determines a breath pop event is currently occurring. A difference is determined between the instantaneous and long term energies to give a delta energy value and this is in turn differenced with the speech energy to give an instantaneous comparison of breath pop energy to speech energy as shown in equation (5).

$$E_{diff}(t) = [E_b(t) - \hat{E}_b(t)] - \lambda E_{speech}(t) \quad (5)$$

In equation (5) $\lambda$ is a bias. A bias ($\lambda$) is used because the equation (5) calculates the difference between two unrelated values (e.g., the difference between the instantaneous breath and long term breath energies and the speech energy). In order to calculate $E_{diff}$ one of the factors is multiplied by a scale factor, e.g., the bias ($\lambda$). The bias can be set to a value, e.g., set to a value of 20. The differenced value is compared to a threshold and if the threshold is exceeded, a breath pop event is deemed to have occurred. The breath-pop event will be determined to be completed when $E_{diff}(t)$ falls below the threshold. A breath pop may span multiple frames. In order to detect each breath pop as single event, if a subsequently calculated $E_{diff}(t)$ exceeds the threshold, but is within a predetermined time period (e.g., 100 ms or 10 frames) of the previous trailing edge of a breath-pop pulse, the event is considered a continuation of the previous breath-pop.

The signal-to-noise ratio for received audio can also be tested. The signal-to-noise ratio (S/N or SNR) is a measure of signal strength relative to background noise. The ratio is often measured in decibels (dB).

To calculate signal to noise conditions the speech recognizer 32 segments the audio into periods of noise (e.g., speaker silence for time periods greater than 100 ms) and periods of speech (e.g., recognition of content words of length greater than 300 ms). Word and silence determination heuristics are used to determine periods of noise and periods of a signal.

Over the period of each word or silence, the total power of the audio frames is accumulated to give an estimate of speech or silence energy. This energy is normalized by dividing by the respective time-period to form mean power statistics.

To ensure a stable estimate of signal-to-noise ratio, the signal and noise mean powers are auto-regressed using the equations (6) and (7).

$$\hat{P}_{Signal}(t) = \lambda \hat{P}_{Signal}(t-1) + \overline{P}_{Signal}(t) \quad (6)$$

$$\hat{P}_{Noise}(t) = \lambda \hat{P}_{Noise}(t-1) + \overline{P}_{Noise}(t) \quad (7)$$

If the total number of silence and speech frames exceeds respective thresholds for an utterance, the regressed power statistics are used to re-compute the signal-to-noise ratio. If not, the regressed statistics are used as a start-point for the next utterance and the signal-to-noise ratio is remains at a previous value.

In addition to testing for the above signal characteristics, the microphone test can also include testing for loss of connection to the microphone 49. A loss of connection can occur, for example, if a user inadvertently unplugs the microphone from the computer. The user may not be aware that the microphone has become disconnected. In order to detect such a condition, the microphone signal is monitored for particular characteristics related to the disconnection of the microphone in addition to the signal-quality characteristics described above. The signal tests used to determine loss of connectivity can vary dependent on the type of computer, type of sound card, operating system, and other setup options for the computer and software.

For example, a Windows PC can include an internal sound card and the microphone can be connected to a port on the computer such that accidental disconnection of the microphone is fairly infrequent. However, if the microphone is disconnected during use, a signal is still received by the speech processing software. Since the microphone is no longer connected, the signal is composed of a low amplitude electrical noise or hum (not speech). This lack of a useful signal is detected as a lack of sufficient signal amplitude in the Microphone Check or as a lack of speech recognition in the initial setup or as an extended lack of recognitions during use of the speech recognition program.

In another example, a different type of detection can be used for computers lacking an internal sound card (e.g., some Macintosh computers). For computers lacking a sound card, an external audio adapter can interface to the user's microphone and headphones. For example, an adapter can plug into the computer's USB bus and the microphone can plug into the adapter. Such a connection can be more susceptible to becoming accidentally disconnected. For some systems, such a disconnection results in the complete cessation of the sampled audio data stream. Since the speech recognition software requests audio data at approximately regular intervals, based on the expected input, an excessive elapsed time since the last successful data read can be used to determine if the microphone has become disconnected. In other systems, the disconnection of the microphone results in the speech recognition software continuing to receive 'audio data', but the data samples do not represent the microphone signal. For example, the data samples can all have values of exactly zero, a condition that is extremely improbable under normal circumstances. In order to detect the disconnection of the microphone, the speech recognition software examines new data samples and infers a USB disconnection if a sufficient amount (e.g., 0.025 second) of consecutive zero-valued data samples is observed.

In some embodiments, the user may not be aware of the operating system and microphone configuration. In order to detect the disconnection of the microphone when the type of computer and operating system is not known, the microphone test routine can test the signal for multiple conditions (e.g., test for a signal having only noise characteristics, a signal having a single value, or the lack of any signal).

Figure 5:
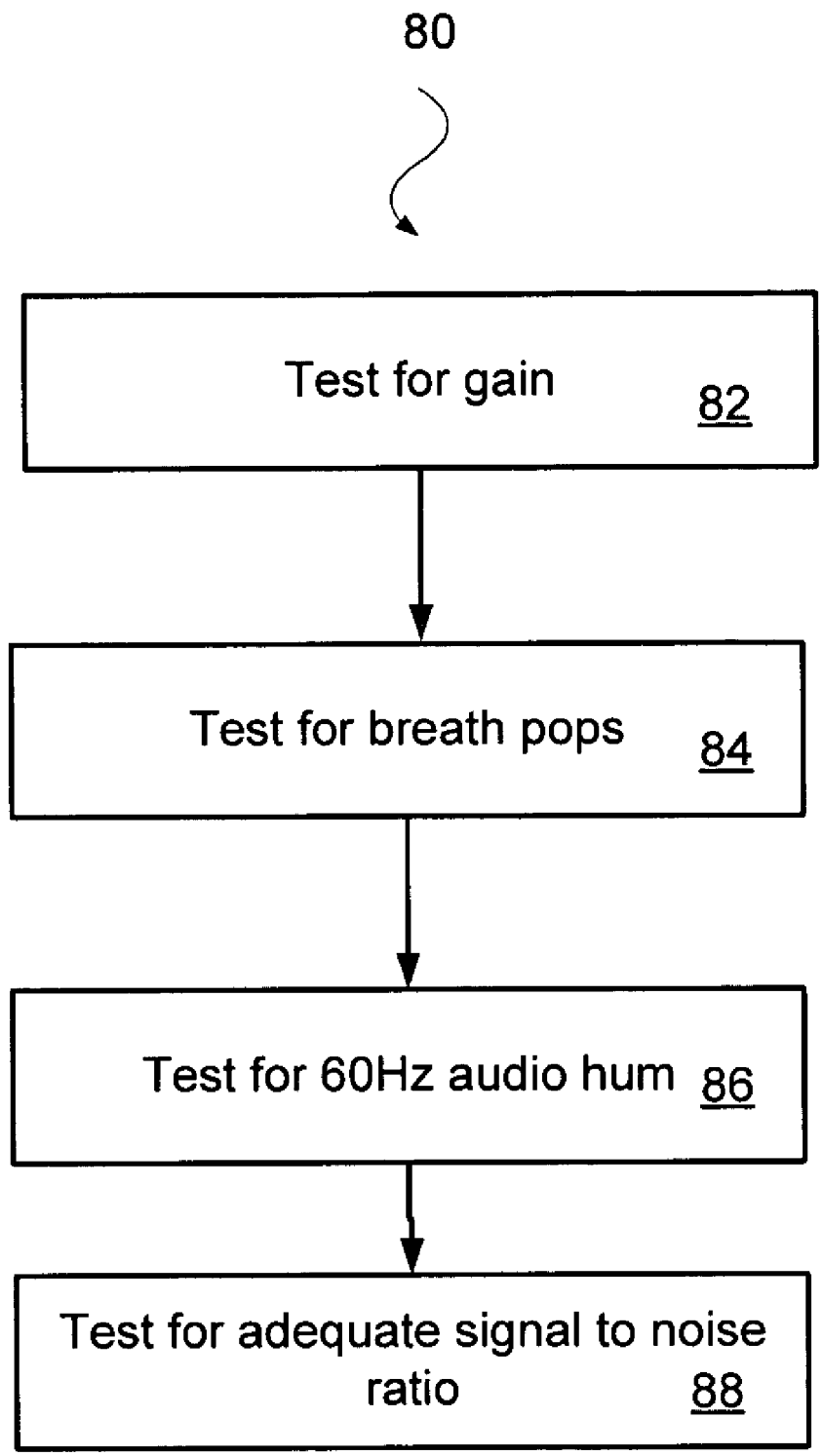
FIG. 5 is a flow chart of a microphone test.

Referring to FIG. 5, a process 80 for testing a signal received from the microphone is shown. Process 80 includes testing and adjusting 82 the gain of the microphone. The gain is adjusted based on the volume of the speech signal received from the user. Process 80 also includes testing 84 for breath pops. As described above, testing for breath pops 84 can include analyzing a speech signal from a user reciting a series of words with multiple letters that are likely to result in wind from the user's oral breath stream at the microphone such as words beginning with the letters 'p' and 't.' Process 80 includes testing 86 for audio hum at the near 60 Hz range. The audio hum can be associated with an interfering a.c. signal such as that from an a.c. power cord. Process 80 also includes testing 88 for an adequate signal-to-noise ratio. Process 80 can be used to test a signal during the setup of a microphone or during the use of the speech recognition program.

Figure 6:
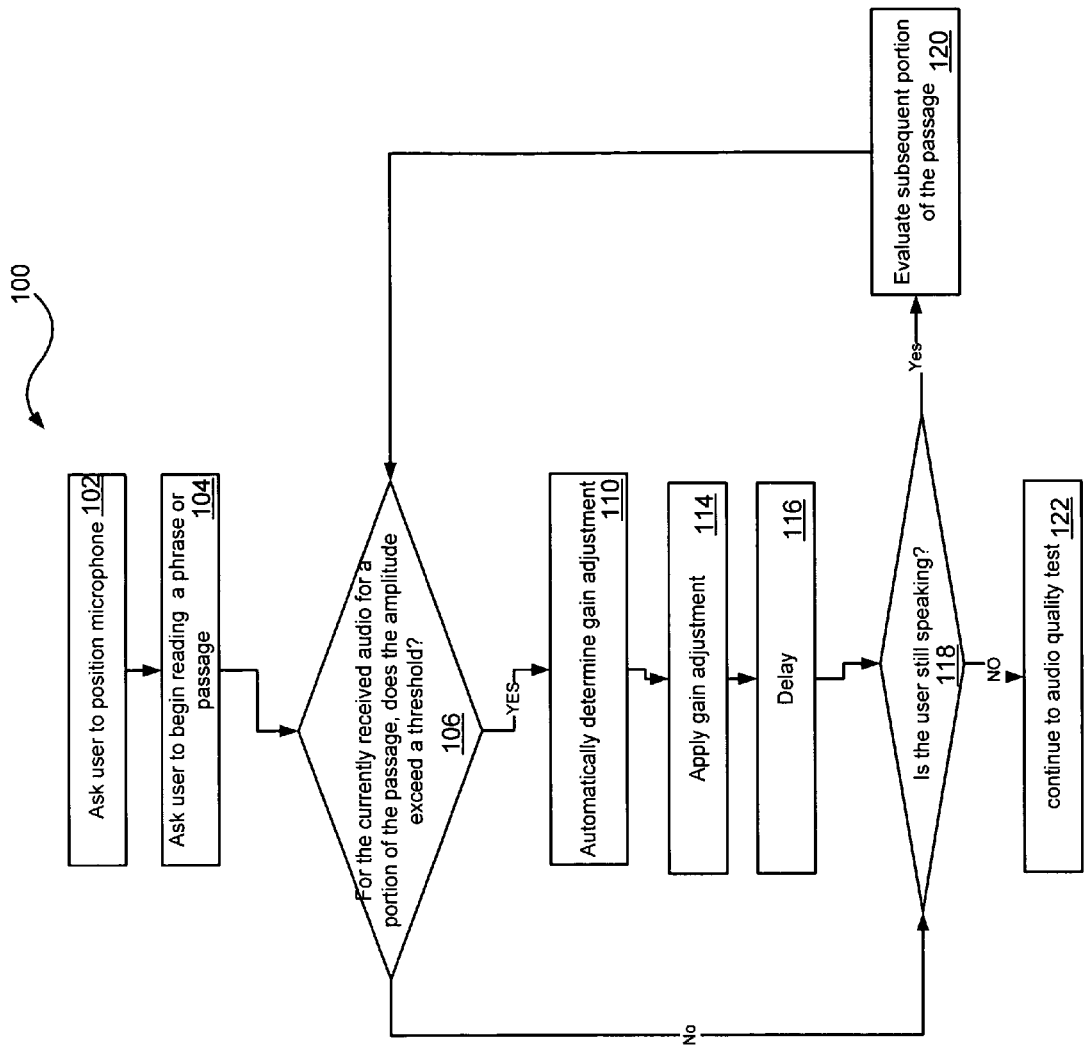
FIG. 6 is a flow chart of a microphone gain test.

Referring to FIG. 6, a process 100 for determining if a signal is received from a user and adjusting the gain for a received signal to an adequate level is shown. Process 100 includes prompting 102 the user to position the microphone at a particular location relative to the user's mouth. The positioning of the microphone can depend on the type of microphone being used. For example, if a headset type microphone is being used, process 100 prompts the user to position the microphone about an inch from the side of the mouth. Process 100 subsequently prompts 104 the user to begin reading a phrase or a passage. For example, process 100 could prompt the user to repeat a short sentence, read a portion of a passage, recite the beginning of the alphabet, or count to 10. The prompting can be via a message displayed on a user interface or via an audio message.

Subsequent to prompting 104 the user to repeat the phrase or passage, process 100 determines 106, for the currently received portion of the audio, if the amplitude of the received signal exceeds a predetermined threshold. If the signal exceeds the threshold, process 100 automatically determines 110 a gain adjustment and applies 114 the gain adjustment. After a short delay 114 to allow the new gain value to take effect, process 100 determines 118 if the user is still speaking or reading the passage. If the user is still speaking, the next portion of the user's utterance is evaluated 120; if the signal amplitude is still too high, the gain adjustment and evaluation continue, possibly repeatedly, as the user continues to speak, until the observed signal amplitude is within an acceptable range. If process 100 determines 118 that the user has finished speaking, process 100 proceeds 122 to the audio quality test (as described below).

Figure 7:
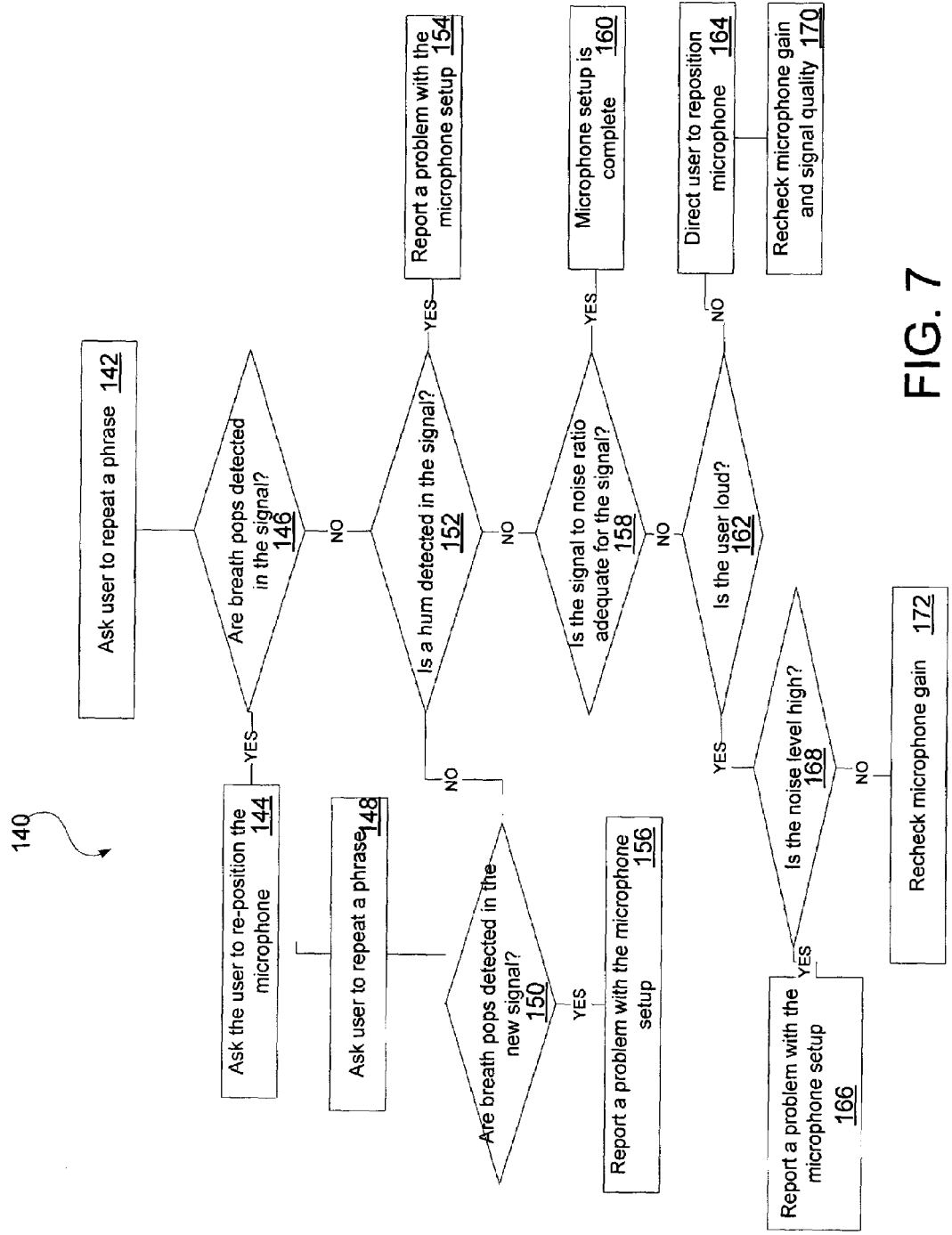
FIG. 7 is a flow chart of a microphone signal quality test.

Referring to FIG. 7, a process 140 for testing the signal quality of a signal received at a computer system 12 from a microphone 36 is shown. A user is prompted 142 to repeat a phrase and based on the received signal, various signal qualities or characteristics are tested. Process 140 includes determining 146 if breath pops are detected in the received signal. If breath pops are detected, process 140 prompts 144 the user to reposition the microphone and prompts 148 the user to repeat another phrase. Process 140 determines 150 if breath pops are present in the repeated phrase. If breath pops are still present, process 140 reports 156 a problem with the microphone. If breath pops do not exist in the originally received audio or in the repeated audio, process 140 determines 152 if a hum is detected in the signal. If a hum is detected in the signal, process 140 reports 154 a problem with the microphone to the user. If a hum is not detected in the signal, process 140 determines 158 if the signal to noise ratio is adequate. If the signal to noise ratio is adequate the microphone setup and testing process 140 is complete and process 140 displays 160 a message to the user. If the signal to noise ratio is not adequate, process 140 determines 162 if the user is loud. If the user is loud and the signal to noise ratio is low, process 140 determines 168 if the level of noise is high (e.g., if the background noise in the room is loud). If the background noise is at a normal level (e.g., not high), the signal quality testing returns 172 to testing the gain according to process 100. If the background noise is above a normal level (e.g., the background noise is high), process 140 reports 166 a problem with the microphone due to the high background noise. On the other hand, if the user is soft (e.g., the user is not loud) and the signal to noise ratio is low, process 140 directs 164 the user to reposition the microphone and rechecks 170 the microphone gain (e.g., using process 100).

Referring to FIGS. 8-12, screenshots for a microphone setup process are shown. The screenshots for the microphone setup display text to help the user through the setup process. In addition to text, the setup screens can include animations, figures, and sound to direct the user through the setup process.

Figure 8:
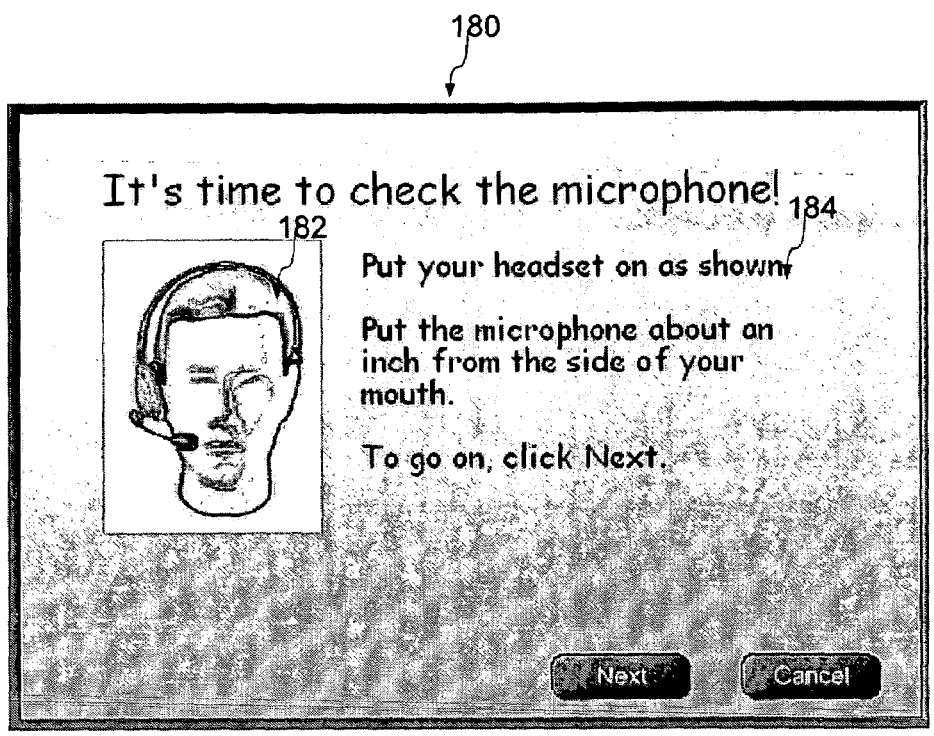
FIGS. 8-12 are a screenshots of a microphone setup.

FIG. 8 shows a screenshot 180 of a display used to direct the user to correctly position the microphone. Screenshot 180 includes written instructions 184. In addition, screenshot 180 includes a pictorial representation 182 of the correct positioning of the microphone. The pictorial representation 182 can be a single image showing the correct microphone placement or can be an animated video or sequence of images showing correct and incorrect microphone placements.

Figure 9:
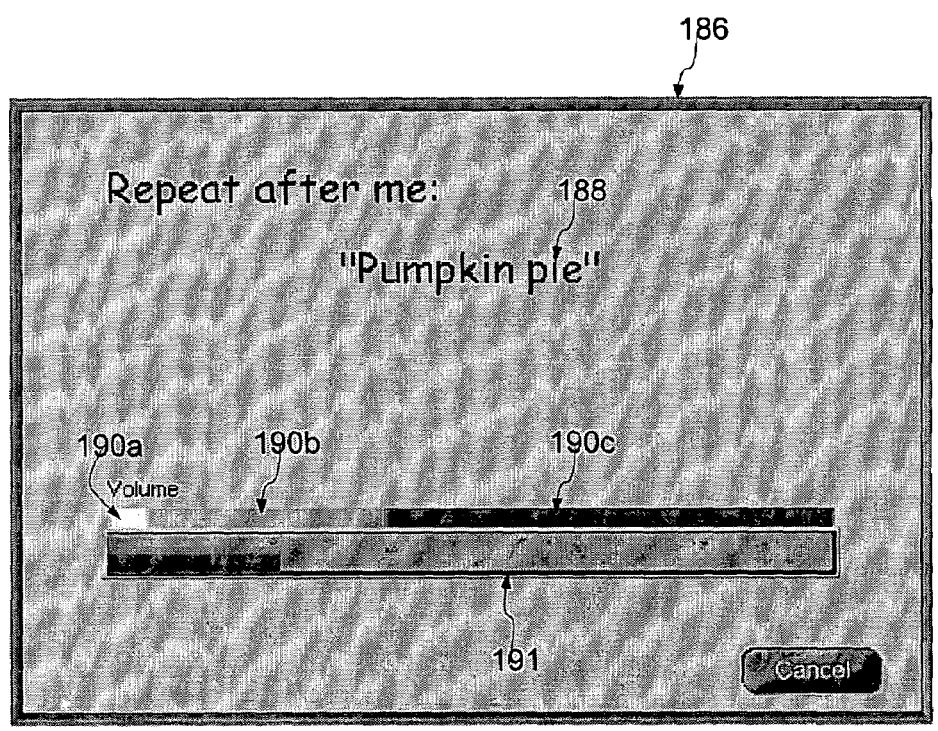

FIG. 9 shows a screenshot 186 used to detect and adjust the volume/gain of a received signal. Screenshot 186 includes a phrase 188 and instructions for the user to repeat the phrase. As a signal is received from the user's microphone, a volume bar 191 indicates to the user the volume level for the received signal. Another bar includes three regions 190a-c. The first region 190a is associated with a volume below the level adequate for speech recognition. The second region 190b is associated with a volume adequate for speech recognition. The third region 190c is associated with a volume above the level adequate for speech recognition. The three regions 190a-c provide the user with an indication of whether the user is speaking too softly or speaking too loudly. In addition, as described above, the system can automatically adjust the gain if the gain is too high or too low such that the user's volume is shifted into region 190b.

Figure 10:
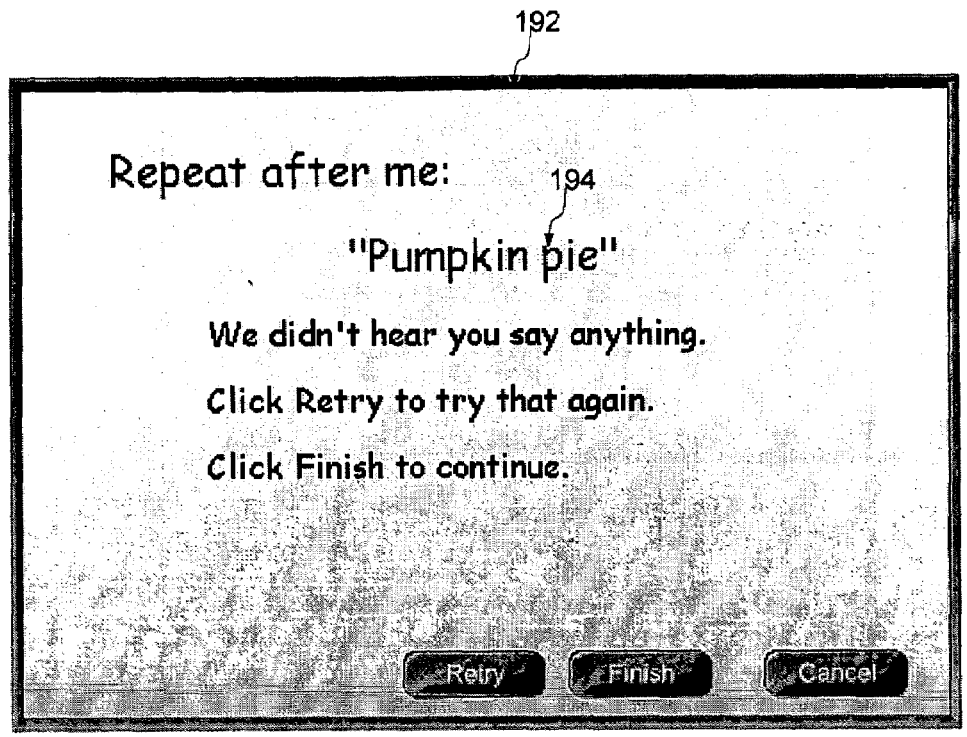
Figure 11:
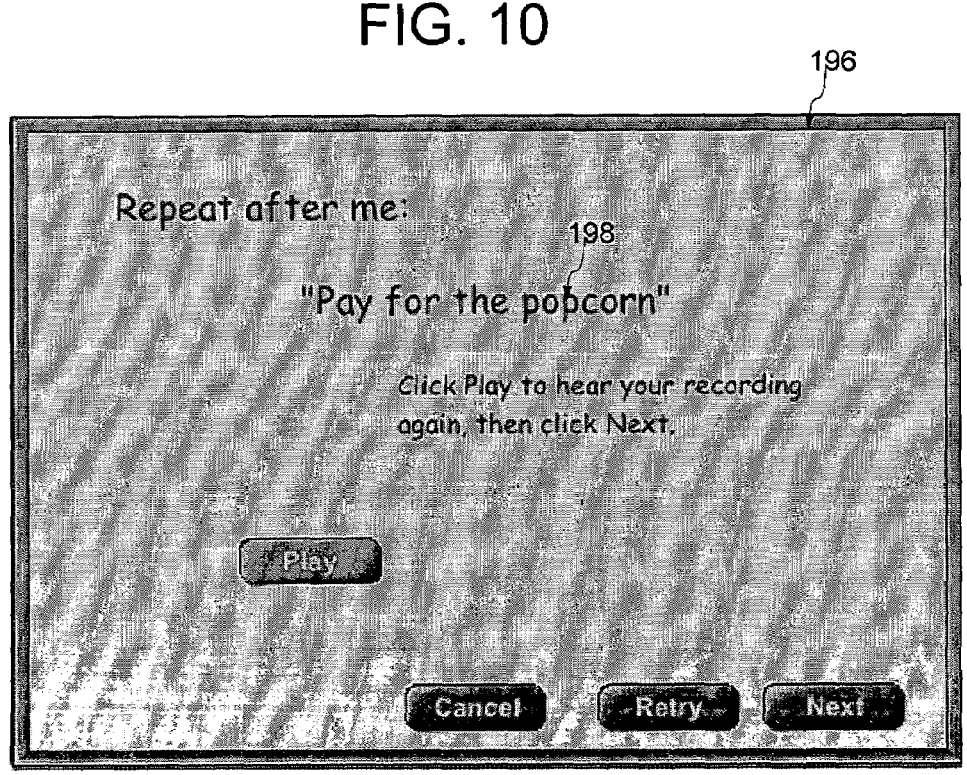

FIGS. 10 and 11 show screenshots 192 and 196 used during the breath pop detection portion of the microphone setup. Screenshots 192 and 196 include instructions for a user to repeat a phrase 194 and 198. Using the signal received from the user repeating the phrase, the system determines if breath pops exist from the wind caused by the user's speech.

Figure 12:
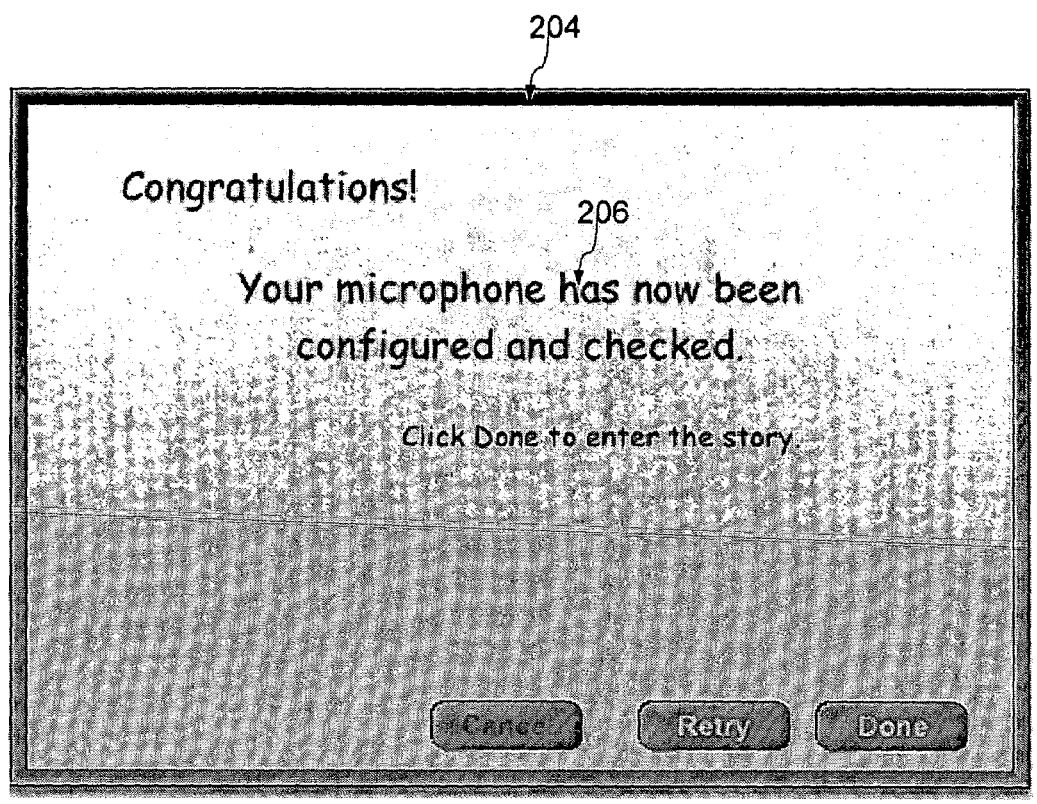

FIG. 12 shows a screenshot 204 of a user interface displayed to the user when the microphone setup and testing is complete. Screenshot 204 includes an indication 206 that the microphone is configured and prompts the user to begin reading a story. During reading of the story various signal characteristics of the signal received from the microphone are tested.

Figure 13:
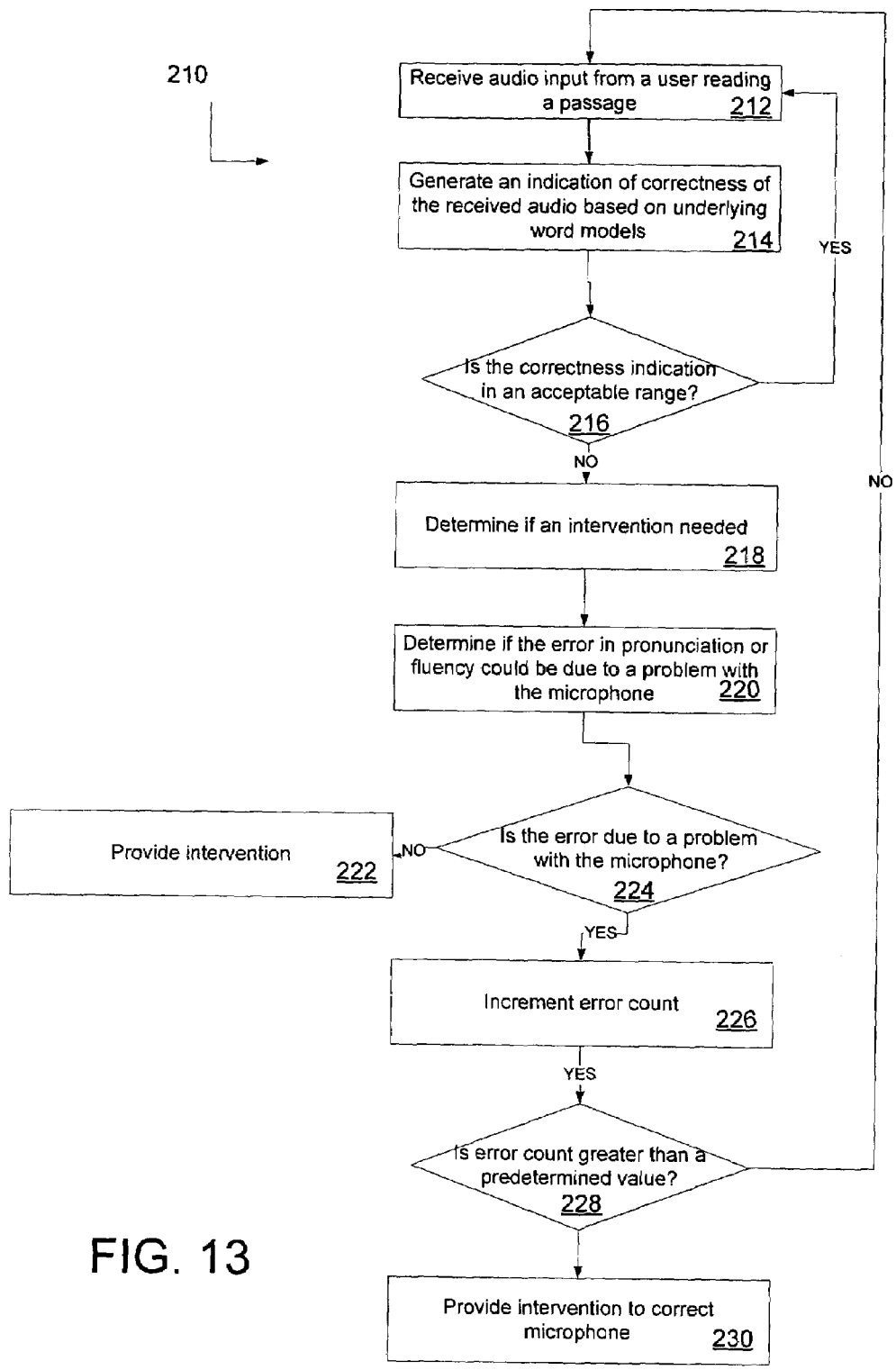
FIG. 13 is a flow chart depicting a technique to determine if a speech recognition error is due to the microphone setup.

Referring to FIG. 13, a flow chart of a process 210 for determining if an intervention is needed based on a microphone error is shown. During the use of reading fluency software, microphone problems may result in increased false negative results. A false negative result occurs when the user correctly says a word, but the reading fluency program does not credit the user with a correct response. False negative results can frustrate the user and may cause decreased fluency due to an increased occurrence of interventions. Process 210 limits the number of interventions by determining if an error could be caused by the microphone setup or quality of the audio signal received. If the problem has a high likelihood of being caused by the microphone, the system can reduce the number of interventions for such detected errors or ask the user to re-setup the microphone. In order to provide interventions based on the microphone setup, the reading fluency software periodically executes a routine to test the audio quality. This audio quality checking executes in the background of the reading fluency program and is not seen by the user unless an intervention based on microphone problems is needed. Detectors included in the continuous real-time audio quality check include at least some of volume detectors, breath pop detectors, hum detectors, and signal to noise ratio detectors. Based on the audio quality checking, if the user is receiving frequent interventions and a potential audio quality problem is detected, a dialog box is displayed instructing the user to re-setup the microphone.

For example, a user may move the microphone closer to his or her mouth during use of the reading fluency software. The closer proximity of the microphone to the user's mouth can increase the wind from the user's speech and produce breath pops in the audio signal. Since the microphone was located further from the user's mouth during setup the breath pops were not detected in setup. In such a situation, the breath pops could produce false negative results for words beginning with the letters 'p' and 't'. If multiple interventions are generated for such words the system can associate the signal quality with the breath pops, and instead of intervening on the word, the system can request that the user correct the problem occurring in the audio signal.

Process 210 for testing signal quality during reading of a passage includes receiving 212 audio input from a user reading the passage and generating 214 a correctness indication of the received audio, that is compared to an underlying word model for the audio. Process 210 determines 216 if the correctness indication is within an acceptable range. If the correctness indication is within an acceptable range (e.g., the expected word was recognized correctly) process 210 returns to receiving 212 audio input. If the correctness indication is not within an acceptable range (e.g., the word was not recognized well.) process 210 determines 218 if intervention by the process 210 is needed. If an intervention is not needed, process 210 returns to receiving 212 audio input. If an intervention is needed, process 210 determines 220 if the error in pronunciation or the low correctness indication could be due to a problem with the microphone setup or the quality of a received audio signal. If the microphone is determined to be operating properly and properly set-up, the process 210 provides an intervention for the word. If the error is determined to be related to the microphone, process 210 increments 226 an error count associated with errors that could be related to the microphone and determines 228 if the incremented error count is greater than a threshold value (e.g., 2, 3, 4, 5). If the error count is not greater than the threshold value, process 210 returns to receiving 212 audio input. If the error count is greater than the threshold value, process 210 provides 230 an intervention to correct the microphone setup. For example, a setup and testing routine as described above could be entered.

A number of embodiments of the invention have been described. Nevertheless, it will be understood that various modifications may be made without departing from the spirit and scope of the invention. For example, the system can provide support to people who speak different languages. The system can have a built in dictionary that will give textually appropriate definition of what a word means, and can give it in English and a user's native language. Accordingly, other embodiments are within the scope of the following claims.

What is claimed is:

1. A method comprising:
    performing a microphone test routine during an initial setup of a speech recognition program, the routine including:

analyzing signal quality of a received electrical signal from a microphone; and performing, at a predetermined time intervals, the microphone testing routine during use of the speech recognition program to detect recognition errors associated with the microphone; and signaling a problem associated with the microphone after a predetermined number of errors associated with the microphone have been detected, wherein the errors associated with the microphone include errors associated with wind noise in the microphone caused by a user's breath stream.

2. The method of claim 1 wherein the errors associated with the microphone include errors associated with hum in the signal received from the microphone.

3. The method of claim 1 wherein the errors associated with the microphone include errors associated with a low signal to noise ratio (SNR).

4. The method of claim 1 wherein the errors associated with the microphone include errors associated with clipping of audio received by the microphone.

5. The method of claim 1 wherein the errors associated with the microphone include errors associated with a loss of connection to the microphone.

6. The method of claim 1 further comprising automatically adjusting a parameter for the microphone based on the signal quality.

7. The method of claim 1 further comprising tracking the errors.

8. The method of claim 1 further comprising setting a gain for the microphone.

9. A method for testing a signal quality for a microphone, the method comprising:

testing a first signal to determine if hum exists in the first signal;

testing a second signal to determine if breath pops are present in the second signal;

testing a third signal to determine if a signal to noise ratio for the third signal is within an acceptable range.

10. The method of claim 9 wherein testing a signal to determine if breath pops are present in the second signal includes:

analyzing a test phrase including words beginning with at least one of the letter 'p' and the letter 't'.

11. The method of claim 10 wherein analyzing a test phrase includes:

determining speech energy attributed to speech in the received signal corresponding to the test phrase;

determining noise energy attributed to noise in the received signal; and comparing the speech energy to the noise energy.

12. The method of claim 10 wherein analyzing a test phrase includes analyzing a signal in a particular frequency range.

13. The method of claim 12 wherein the frequency range is in a range about a frequency of nearby a.c. power sources that may interfere with the signal from the microphone.

14. The method of claim 12 wherein the frequency range is between approximately 55 Hz and 65 Hz.

15. The method of claim 9 wherein testing a signal to determine if a hum exists includes detecting presence of an approximately constant signal component.

16. The method of claim 15 wherein the approximately constant signal is within a predetermined frequency range.

17. The method of claim 16 wherein the predetermined frequency range is approximately 55-65 Hz.

18. The method of claim 9 further comprising testing a sound level of the signal.

19. The method of claim 9 wherein the first signal, second signal, and third signal are the same signal.

20. The method of claim 9 wherein the first signal, second signal, and third signal are each different signals.

21. A computer program product residing on a computer readable medium comprising instructions for causing an electrical device to:

perform a microphone test during an initial setup of a speech recognition program, the routine including instructions to:

analyze signal quality of a received electrical signal from a microphone;

set a gain for the microphone;

perform at a predetermined regular time interval the microphone testing routine during use of the speech recognition program to detect recognition errors associated with the microphone; and signal a problem associated with the microphone after a predetermined number of errors associated with the microphone have been detected, wherein the routine includes instructions to detect errors associated with wind noise in the microphone caused by a user's breath stream.

22. The computer program of claim 21 wherein the routine includes instructions to detect errors associated with hum in the signal received from the microphone.

23. The computer program of claim 21 wherein the routine includes instructions to detect errors associated with a low signal to noise ratio (SNR).

24. A computer program product residing on a computer readable medium for testing a signal quality for a microphone, comprising instructions for causing an electrical device to:

test a first signal to determine if a hum exists in the first signal;

test a second signal to determine if breath pops are present in the second signal; and test a third signal to determine if a signal to noise ratio for the third signal is within an acceptable range.

25. The computer program of claim 24 wherein instructions to test a signal to determine if breath pops are present in the second signal includes instructions to:

analyze a test phrase including words beginning with at least one of the letter 'p' and the letter 't'.

26. The computer program of claim 25 wherein instructions to analyze includes instructions to analyze a signal in a particular frequency range.

27. The computer program of claim 24 wherein instructions to analyze include:

determine speech energy attributed to speech in the received signal corresponding to the test phrase;

determine noise energy attributed to noise in the received signal; and compare the speech energy to the noise energy.

28. A device configured to:

perform a microphone test during an initial setup of a speech recognition program, the routine including instructions to:

analyze signal quality of a received electrical signal from a microphone;

set a gain for the microphone;

perform at a predetermined regular time interval the microphone testing routine during use of the speech recognition program to detect recognition errors associated with the microphone; and signal a problem associated with the microphone after a predetermined number of errors associated with the microphone have been detected, wherein the routine includes instructions to detect errors associated with wind noise in the microphone caused by a user's breath stream.

29. The device of claim 28 wherein the routine includes instructions to detect errors associated with hum in the signal received from the microphone.

30. The device of claim 28 wherein the routine includes instructions to detect errors associated with a low signal to noise ratio (SNR).

31. The device of claim 28 wherein instructions to analyze include:
   determine speech energy attributed to speech in the received signal corresponding to the test phrase;
   determine noise energy attributed to noise in the received signal; and
   compare the speech energy to the noise energy.

32. A device configured to:
   test a first signal to determine if a hum exists in the first signal;
   test a second signal to determine if breath pops are present in the second signal; and
   test a third signal to determine if a signal to noise ratio for the third signal is within an acceptable range.

33. The device of claim 32 wherein instructions to test a signal to determine if breath pops are present in the second signal includes instructions to:
   analyze a test phrase including words beginning with at least one of the letter 'p' and the letter 't'.

34. The device of claim 33 wherein instructions to analyze includes instructions to analyze a signal in a particular frequency range.

35. A method comprising:
   performing a microphone test routine during an initial setup of a speech recognition program, the routine including:
   analyzing signal quality of a received electrical signal from a microphone; and
   performing, at a predetermined time intervals, the microphone testing routine during use of the speech recognition program to detect recognition errors associated with the microphone; and
   signaling a problem associated with the microphone after a predetermined number of errors associated with the microphone have been detected, wherein the errors associated with the microphone include errors associated with hum in the signal received from the microphone.

36. The method of claim 35 wherein the errors associated with the microphone include errors associated with a low signal to noise ratio (SNR).

37. The method of claim 35 wherein the errors associated with the microphone include errors associated with clipping of audio received by the microphone.

38. The method of claim 35 wherein the errors associated with the microphone include errors associated with a loss of connection to the microphone.

39. A computer program product residing on a computer readable medium comprising instructions for causing an electrical device to:
   perform a microphone test during an initial setup of a speech recognition program, the routine including instructions to:
   analyze signal quality of a received electrical signal from a microphone;
   set a gain for the microphone;
   perform at a predetermined regular time interval the microphone testing routine during use of the speech recognition program to detect recognition errors associated with the microphone; and
   signal a problem associated with the microphone after a predetermined number of errors associated with the microphone have been detected, wherein the routine includes instructions to detect errors associated with hum in the signal received from the microphone.

40. The computer program of claim 39 wherein the routine includes instructions to detect errors associated with a low signal to noise ratio (SNR).

41. A device configured to:
   perform a microphone test during an initial setup of a speech recognition program, the routine including instructions to:
   analyze signal quality of a received electrical signal from a microphone;
   set a gain for the microphone;
   perform at a predetermined regular time interval the microphone testing routine during use of the speech recognition program to detect recognition errors associated with the microphone; and
   signal a problem associated with the microphone after a predetermined number of errors associated with the microphone have been detected, wherein the routine includes instructions to detect errors associated with hum in the signal received from the microphone.

42. The device of claim 41 wherein the routine includes instructions to detect errors associated with a low signal to noise ratio (SNR).

* * * * *